Oct. 12, 1943.    S. SCHNELL    2,331,349
BRAKE SHOE MOUNTING
Filed Dec. 22, 1941    2 Sheets-Sheet 1
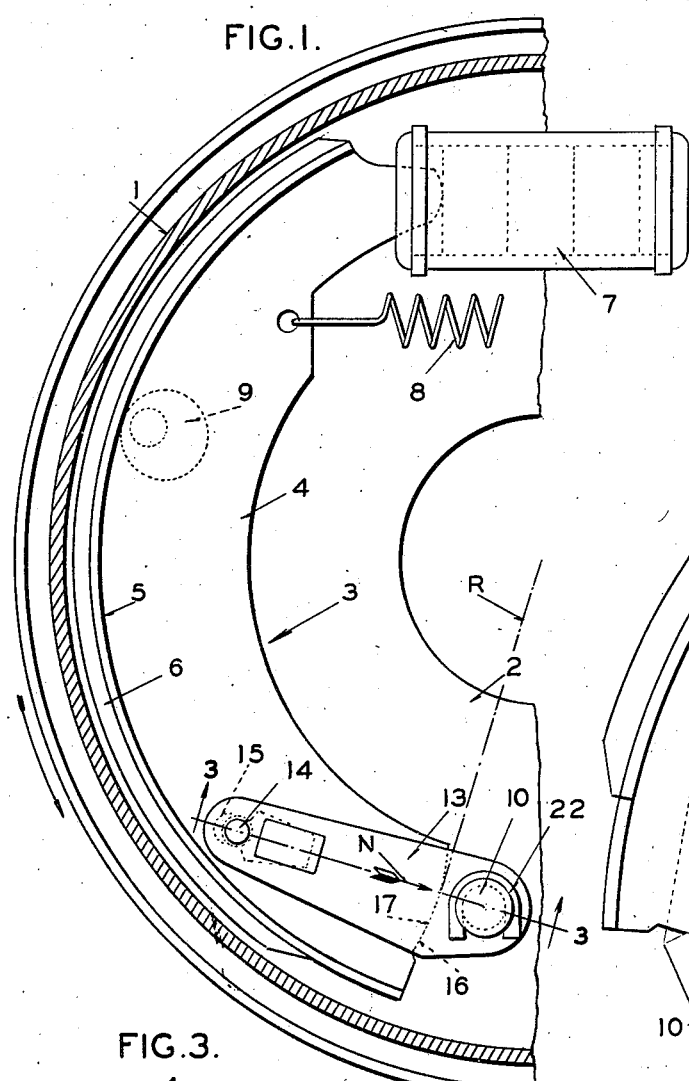
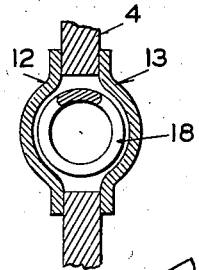
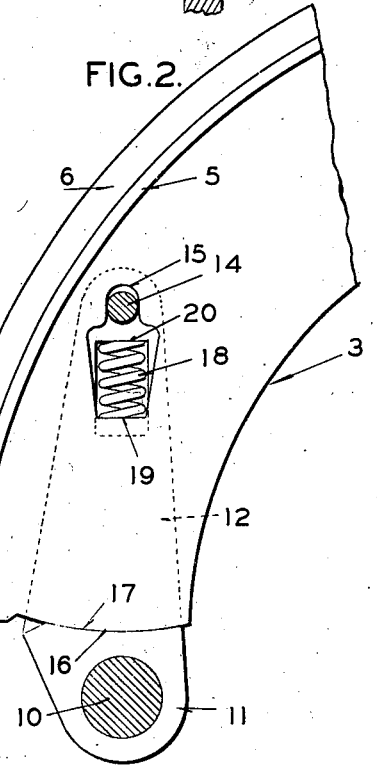
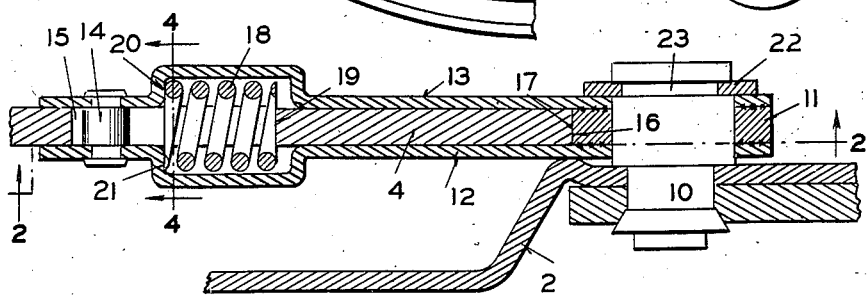
INVENTOR
STEVE SCHNELL
BY
ATTORNEY Oct. 12, 1943.    S. SCHNELL    2,331,349
BRAKE SHOE MOUNTING
Filed Dec. 22, 1941    2 Sheets-Sheet 2
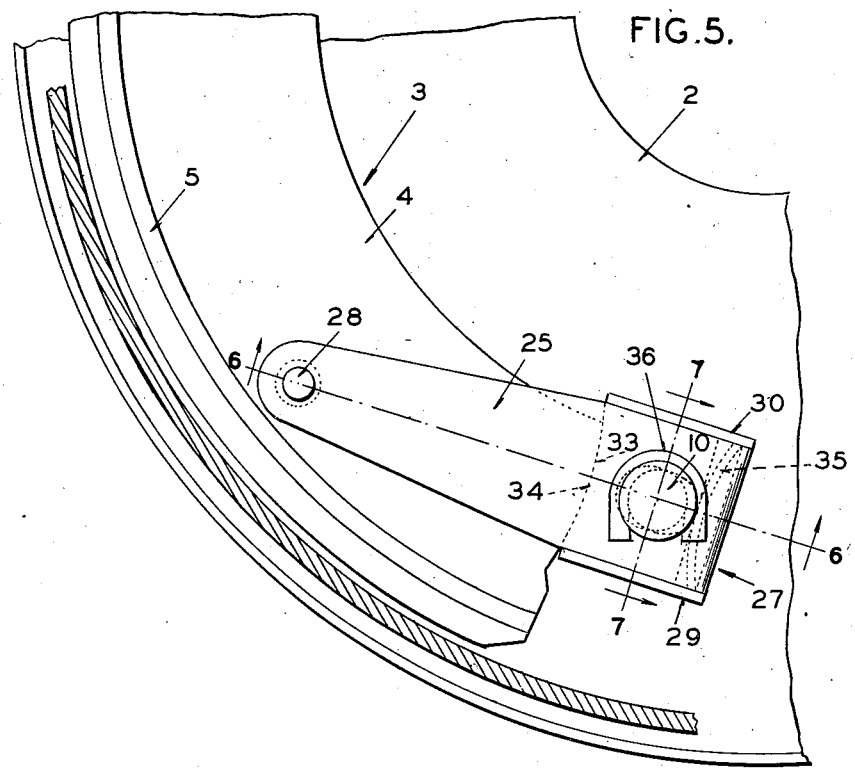
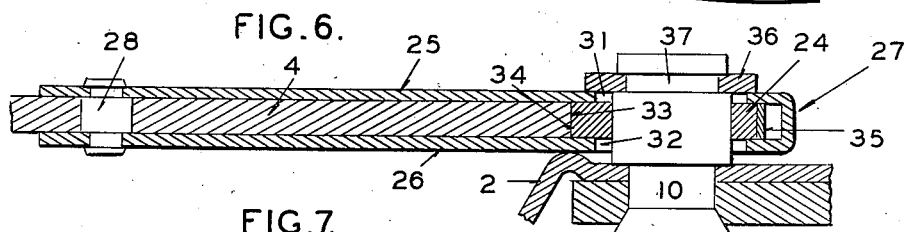
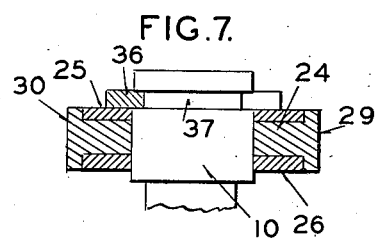
INVENTOR
STEVE SCHNELL
BY
ATTORNEY Patented Oct. 12, 1943

2,331,349

UNITED STATES PATENT OFFICE 2,331,349

BRAKE SHOE MOUNTING

Steve Schnell, Kirkwood, Mo., assignor to Wagner Electric Corporation, St. Louis, Mo., a corporation of Delaware Application December 22, 1941, Serial No. 423,896

16 Claims. (Cl. 188—79.5)

My invention relates to brakes and more particularly to an improved brake shoe mounting.

One of the objects of my invention is to provide an improved brake shoe mounting which will permit the mounted end of the shoe to automatically move toward the drum and centralize the brake shoe in order to produce a self centering brake shoe at all times.

Another object of my invention is to provide an improved mounting for a brake shoe which will permit the anchored end to automatically adjust itself as lining wear takes place.

Another object of my invention is to provide a brake shoe mounting wherein the circumferential force acting on the shoe will not have any tendency to move the mounted end of the shoe either toward or away from the drum during braking regardless of drum expansion or lining wear.

Still another object of my invention is to provide a brake shoe mounting which will insure that the force of the shoe acting through the anchor pin during braking will not change its angular relation with respect to a radial line of the brake assembly which is at right angles thereto.

Other objects of my invention will become apparent from the following description taken in connection with the accompanying drawings wherein Figure 1 is a view of a portion of a brake assembly showing a brake shoe mounted on structure embodying my invention; Figure 2 is an enlarged view of the shoe mounting with a link removed; Figure 3 is a sectional view taken on the line 3—3 of Figure 1; Figure 4 is a sectional view taken on the line 4—4 of Figure 3; Figure 5 is a view of another mounting construction embodying my invention; and Figures 6 and 7 are sectional views taken on the lines 6—6 and 7—7, respectively, of Figure 5.

Referring in detail to Figures 1 to 4, the numeral 1 indicates the usual drum of a brake rotatable with a rotatable member and 2 is the fixed backing plate or support which closes the open side of the drum. Within the drum on one side thereof is shown a brake shoe 3 for cooperation with the drum, said shoe comprising a web 4 and a flange 5 to which is secured the lining 6. The toe end of the brake may be actuated by any suitable means, that shown being a fluid motor 7 of a hydraulic actuating system, said motor also being of such type as to actuate a like shoe on the opposite side of the drum. A spring 8 is employed to retract the shoe from the drum, the retracted position of the toe end being determined by the adjustable cam 9 carried by the backing plate.

The mounting for the heel end of the brake shoe which embodies my invention comprises a usual anchor pin 10 secured to the backing plate and pivotally mounted on this pin is a block 11 and two links 12 and 13 on opposite sides thereof, said block and links being secured together, as by welding, in order that relative rotative movement therebetween will not take place. The links 12 and 13 extend on opposite sides of the web of the brake shoe and have their ends remote from the anchor pin pivotally connected with the brake shoe by means of pin 14 secured to the links and positioned in a slot 15 in said web, the width of said slot being such as to snugly receive the pin.

The heel end of web 4 of the shoe is in abutting relation with block 11. The abutting surface 16 on the block is curved with its axis of curvature coinciding with the center of pin 14. The cooperating abutting surface 17 on the web of the shoe is of like curvature. By means of this curvature of the surfaces, the shoes can have relative rotative movement with respect to the links about pin 14 as an axis and the links can have rotation on the anchor pin. The surfaces will remain in abutting engagement over their entire areas, a relative sliding of the surfaces taking place. Whenever the links rotate on the anchor pin, block 11 will rotate with them so that full area of the surfaces will always be in engagement. If it is assumed that the drum is rotating in the direction of the arrow when the shoe is applied, there will be produced a force acting on the anchor pin through block 11. This force is the resultant of the circumferential force acting on the shoe and caused by the drag of the drum on the lining and a second downward force acting on the shoe. This resultant force is designated by the arrow N in Figure 1. In order that the heel end of the shoe will have no tendency to move either toward or away from the drum during braking action, this resultant force N should at all times be at right angles to a radial line of the drum center at the point where said force is transferred from the shoe to the anchor block. This is accomplished by the shoe mounting described. In the construction shown, this radial line will be tangent to the curved surfaces 16 and 17, the point of tangency coinciding with the point at which the force N acts. This relationship of the force N will always be at right angles to a radial line R which is tangent to the curved surfaces 16 and 17 regardless of drum expansion due to heat or of lining wear and throughout the working range of the brake shoe.

Let it be assumed that when the lining is new and the brake drum is cold, the relationship of the force N and the radial line R is as shown in Figure 1 when the brake is applied. When there is wear of the lining or expansion of the brake drum due to heat, the shoe will move outwardly and there will be a pivoting of the shoe about pin 14. This will result in the curved surface 17 sliding on curved surface 16. There will also be a pivoting of links 12 and 13 on the anchor pin and a relative movement between said links and the shoe since the links are pivoted to the shoe by pin 14. The movement of the shoe, however, will not alter the direction of the force N but it will act below the position of force N as shown in Figure 1. It will still be at right angles to a radial line from the center of the brake drum which is tangent to curved surfaces 16 and 17. This radial line will be slightly changed from the radial line R as shown, due to the fact that the curved surfaces 16 and 17 have had their centers shifted by the rotation of the links on the anchor pin as a result of pin 14 and the shoe being moved toward the drum. Thus it is seen that the force N will continue to be at right angles to a radius of the drum and at a point where the pressure is transferred from the shoe to block 11.

Thus by producing a mounting wherein the relationship between the force N and a radial line is maintained at right angles under all conditions within the range of the brake shoe movement, the mounted end of the shoe will have no force acting upon it which will tend to move it either away from or toward the drum and, therefore, the shoe can at all times be maintained self-centered. Such a mounted brake shoe is substantially perfectly controllable by the actuating means which in this instance is the fluid motor. Furthermore, such a self-centering mounted shoe also results in a maximum braking torque since the mounted end of the shoe can automatically move out with the drum as it expands or as the lining wears and thus produce the desired braking action over the entire area of the brake lining.

It is to be noted that the anchor pin will receive all the force resulting from that applied to the toe end of the shoe and that of the self-energizing action of the brake shoe. The links transmit no force due to the fact that pin 14 cannot be engaged by the end of slot 15.

In order that the curved surfaces 16 and 17 may be held in tight frictional engagement at all times there is provided a coil spring 18 which is interposed between a shoulder 19 of the web and shoulders 20 and 21 on the links. The spring is positioned in an enlarged extension of slot 15, one end of which forms the shoulder 19, and the links are provided with recesses to receive portions of the spring and provide the shoulders 20 and 21. The spring is under axial compression and thus it applies a constant pressure holding surface 17 and the end of the shoe web in tight frictional engagement with surface 16. Because of the tight frictional engagement, the relative positions of surfaces 16 and 17 will always be maintained unless there is a superior force present causing a change.

The links and the anchor block are held on the anchor pin by a C-washer 22 cooperating with a groove 23 in the pin surface.

Referring to the operation of the brake shoe mounting just described, the block and the links are mounted on the brake shoe and the anchor pin in the manner shown. As soon as pressure is applied to the toe end of the shoe by the fluid motor, the brake shoe will be brought into engagement with the drum over the entire area of the brake shoe lining. This is permitted since the force bringing the shoe into engagement is greater than that of spring 18 producing the friction between surfaces 16 and 17. When the brake fluid is released by the fluid motor the retracting spring 8 will bring it back against stop 9. During this releasing movement there will be no relative sliding movement between surfaces 16 and 17 due to the action of spring 18 holding them in tight frictional engagement. The shoe will be released from the drum by a pivotal movement about the anchor pin in the same manner as if the shoe web were actually pivoted on the anchor pin. When the shoe is next brought into engagement with the drum it will pivot around anchor 10 and there will still be no sliding movement between surfaces 16 and 17. However, when lining wear takes place or the drum expands there will result a relative rotative movement between the brake shoe and the links 13, which movement will be about pin 14 as an axis. The links 13 will also pivot on the anchor pin. Thus there will result a sliding movement between surfaces 16 and 17 due to the fact that the force holding the shoe in engagement with the drum (the force created by the fluid motor and the force resulting from the self-energizing action of the brake shoe) will be great enough to overcome any frictional resistance caused by spring 18. Thus it is apparent that there will be an automatic adjustment of surfaces 16 and 17. This automatic adjustment will be maintained due to the frictional engagement between said surfaces if the adjustment is the result of lining wear. If the adjustment is due to drum expansion there will be a readjustment as the drum contracts and "wipes" the released shoe.

It is to be particularly noted that in the brake shoe mounting shown there is no sliding of the shoe end on a plane surface which is so arranged that when extended it will have a definite relation to the drum center. The shoe end moves in a path as determined by the curved surfaces which have their centers moved as the shoe moves outwardly due to the block being secured to the links and the links pivoted to the brake shoe.

Referring now to the construction shown in Figures 5, 6 and 7, the brake drum, the backing plate, and the brake shoe are indicated by the same references as in Figure 1, as is also the anchor pin upon which the shoe is to be mounted. On the anchor pin 10 is pivotally mounted an anchor block 24. The links for the mounting comprise legs 25 and 26 of a U-shaped strap 27, said legs extending on opposite sides of web 4 and being pivoted to the web by a pin 28. Relative rotation between the anchor block and the U-shaped strap is prevented by providing the block with flanges 29 and 30 which overlie the upper and lower edges of the legs of the strap. The openings 31 and 32 in the legs of the strap which receive the anchor pin are in the form of slots which permit the strap to have relative sliding movement with respect to the block and the anchor pin. The block 24 is provided with a curved surface 33 for cooperation with a curved surface 34 on the end of web 4 of the shoe, said surfaces having their axis of curvature coinciding with the axis of pin 28. In order that these surfaces may be held in tight frictional engagement, I have provided a strong leaf spring 35 which is interposed between the block and the closed end of the U-shaped strap. The sliding movement of the strap with respect to the block permits the force transmitted by the spring to cause the surfaces to have pressure engagement. A C-washer 36 cooperates with a groove 37 in the anchor pin to hold the U-shaped strap and the block on the anchor pin.

The operation of this mounting construction is the same as the construction shown in Figures 1 to 5. It is to be noted that there is no relative rotative movement permitted between the block 24 and the legs of the U-shaped strap. Thus, whenever the U-shaped strap is rotated about the anchor pin, the anchor block will also be rotated with it. Also, in this construction there is no force transmitted through the links from the brake shoes to the anchor block as all the force from the brake shoe to the block is transmitted directly through the curved surfaces which are always maintained in engagement.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States:

1. In braking mechanism, a support, a brake drum, a brake shoe, means for actuating one end of the brake shoe, and mounting means for the other end of the brake shoe including a pivoted anchor member for preventing circumferential movement of the shoe and other means permitting the shoe end to move outwardly relative to the anchor member, said other means including means for maintaining a predetermined fixed relationship between the direction of the resultant force acting on the anchor member when the shoe is engaged with the drum and a radial line of the brake assembly passing through the point at which the force acts on the anchor member and regardless of expansion of the drum during braking or lining wear.

2. In braking mechanism, a support, a brake drum, a brake shoe, means for actuating one end of the brake shoe, and mounting means for the other end of the brake shoe including a pivoted anchor member for preventing circumferential movement of the shoe and other means permitting the shoe end to move outwardly relative to the anchor member, said other means including means for causing the resultant force acting on the anchor member when the shoe is engaged with the drum to always be at right angles to a radial line of the brake assembly passing through the point at which the force acts on the anchor member and regardless of expansion of the drum during braking or lining wear.

3. In braking mechanism, a support, a brake drum, a brake shoe, brake shoe mounting and adjusting means permitting pivotal movement of the shoe end and comprising pivoted abutment means carried by the support at the end of the shoe for preventing circumferential movement of said shoe and other means permitting the shoe end to move outwardly toward the drum relative to the pivotal axis of the shoe when the brake lining thickness at the end of the shoe is reduced by wear, said other means also so controlling the relationship between the shoe end and the abutment means that the force acting on the abutment means will always have a fixed relationship to a radial line of the brake assembly which passes through the point at which said force acts on the abutment means, and means for maintaining the shoe end in adjusted position.

4. In braking mechanism, a support, a brake drum, a brake shoe, means for actuating one end of the brake shoe, mounting means for the other end of the brake shoe including a pivoted anchor member for preventing circumferential movement of the shoe and other means permitting the shoe end to move outwardly relative to the anchor, said other means including means for maintaining a predetermined fixed relationship between the direction of the resultant force acting on the anchor member when the shoe is engaged with the drum and a radial line of the brake assembly passing through the point at which the force acts on the anchor member and regardless of expansion of the drum during braking or lining wear, and means for maintaining the shoe end in an outward adjusted position to compensate for lining wear.

5. In braking mechanism, a support, a brake drum, a brake shoe having a curved abutment surface at its mounted end, a pivoted member on the support provided with a like curved abutment surface for cooperation with the curved shoe end surface, and means for causing said pivoted member to be rotated by the shoe and the two abutment surfaces to have relative sliding movement when the shoe is engaged with the drum and moves outwardly as a result of expansion of the drum or of lining wear.

6. In braking mechanism, a support, a brake drum, a brake shoe having a curved abutment surface at its mounted end, a pivoted member on the support provided with a like curved abutment surface for cooperation with the curved shoe end surface, means for causing said pivoted member to be rotated by the shoe and the two abutment surfaces to have relative sliding movement when the shoe is engaged with the drum and moves outwardly as a result of expansion of the drum or lining wear, and means for maintaining the curved surfaces in pressure engagement.

7. In braking mechanism, a support, a brake drum, a brake shoe having a curved abutment surface at its mounted end, a pivoted member on the support provided with a curved abutment surface for cooperation with the curved shoe end surface, and means for so connecting the pivoted member to the shoe that said pivoted member will be rotated by the shoe when the shoe is engaged with the drum and moves outwardly as a result of expansion of the drum or lining wear, said connecting means permitting the curved surfaces to have relative sliding movement as the shoe moves outwardly.

8. In braking mechanism, a support, a brake drum, a brake shoe having a curved abutment surface at its mounted end, a pivoted member on the support provided with a curved abutment surface for cooperation with the curved shoe end surface, and means for so connecting the pivoted member to the shoe that said pivoted member will be rotated by the shoe when the shoe is engaged with the drum and moves outwardly as a result of expansion of the drum or lining wear, said connecting means permitting the curved surfaces to have relative sliding movement as the shoe moves outwardly and including means for maintaining said surfaces in pressure engagement so that said shoe and pivoted member will be held from relative movement when the shoe is engaged with and disengaged from the drum.

9. In braking mechanism, a support, a brake drum, a brake shoe having a convex curved abutment surface at its mounted end, a pivoted member on the support provided with a concave curved abutment surface for cooperation with the curved shoe end surface, and means for causing said pivoted member to be rotated by the shoe and the two curved abutment surfaces to have relative movement when the shoe is engaged with the drum and moves outwardly as a result of expansion of the drum or of lining wear, said means comprising a member pivoted to the shoe at a point coinciding with the axis of the curved surface on the end of the shoe.

10. In braking mechanism, a support, a brake drum, a brake shoe having a convex curved abutment surface at its mounted end, a pivoted member on the support provided with a concave curved abutment surface for cooperation with the curved shoe end surface, means for causing said pivoted member to be rotated by the shoe and the two abutment surfaces to have relative sliding movement when the shoe is engaged with the drum and moves outwardly as a result of expansion of the drum or of lining wear, said means comprising a member pivoted to the shoe at a point coinciding with the axis of the curved surface on the end of the shoe, and means for maintaining the curved surfaces in their relative positions assumed as a result of outward movement of the shoe due to lining wear.

11. In braking mechanism, a support, a brake drum, a brake shoe having a convex curved abutment surface at its mounted end, a pivoted member on the support provided with a concave curved abutment surface for cooperation with the curved shoe end surface, a link secured to the pivoted member and pivoted to the shoe for causing said pivoted member to be rotated by the shoe and the abutment surfaces to have relative sliding movement when the shoe is engaged with the drum and moves outwardly as a result of expansion of the drum or of lining wear, said link being pivoted to the shoe at a point coinciding with the axis of the curved surface on the end of the shoe, and spring means for maintaining the curved surfaces in their relative positions assumed as a result of outward movement of the shoe due to lining wear.

12. In braking mechanism, a support, a brake drum, a brake shoe having a curved abutment surface at its mounted end, an anchor pin carried by the support, a bearing block pivotally mounted on the anchor pin and provided with a curved abutment surface for cooperation with the curved shoe end surface, a link non-rotatably secured to the block and pivotally connected to the shoe so as to be rotated by said shoe and result in the abutment surfaces having relative sliding movement when the shoe moves outwardly but not transmitting any force from the shoe to the anchor pin, said curved surfaces having the same radius of curvature with a common axis coinciding with the axis of the pivotal connection between the link and the shoe, and means for maintaining said curved surfaces in pressure engagement.

13. In braking mechanism, a support, a brake drum, a brake shoe having a curved abutment surface at its mounted end, an anchor pin carried by the suport, a bearing block pivotally mounted on the anchor pin and provided with a curved abutment surface for cooperation with the curved shoe end surface, links non-rotatably secured to opposite sides of the block and pivotally connected to opposite sides of the shoe so as to be rotated by said shoe and result in the abutment surfaces having relative sliding movement when the shoe moves outwardly but not transmitting any force from the shoe to the anchor pin, said curved surfaces having the same radius of curvature with a common axis coinciding with the axis of the pivotal connection between the links and the shoe, and spring means for maintaining said curved surfaces in pressure engagement.

14. In braking mechanism, a support, a brake drum, a brake shoe having a curved abutment surface at its mounted end, an anchor pin carried by the support, a bearing block pivotally mounted on the anchor pin and provided with a curved abutment surface for cooperation with the curved shoe end surface, a link non-rotatably secured to the block and pivotally connected to the shoe so as to be rotated by said shoe and result in the abutment surfaces having relative sliding movement when the shoe moves outwardly but not transmitting any force from the shoe to the anchor pin, said curved surfaces having the same radius of curvature with a common axis coinciding with the axis of the pivotal connection between the link and the shoe, and a spring interposed between abutments on the shoe and on the link and applying a force holding the curved surfaces in pressure engagement.

15. In braking mechanism, a support, a brake drum, a brake shoe having a convex curved abutment surface at its mounted end, a pivoted member on the support provided with a concave curved abutment surface for cooperation with the curved shoe end surface, a link non-rotatably secured to the pivoted member and pivoted to the shoe for causing said pivoted member to be rotated by the shoe and the abutment surfaces to have relative sliding movement when the shoe is engaged with the drum and moves outwardly as a result of expansion of the drum or of lining wear, said link being pivoted to the shoe at a point coinciding with the axis of the curved surface on the end of the shoe, and means comprising a spring interposed between the link and the pivoted member for maintaining the curved surfaces in pressure engagement but permitting their relative sliding movement.

16. In braking mechanism, a support, a brake drum, a brake shoe having a curved abutment surface at its mounted end, an anchor pin carried by the support, a bearing block pivotally mounted on the anchor pin and provided with a curved abutment surface for cooperation with the curved shoe end surface, a U-shaped link receiving the block and being non-rotatably secured to the block but capable of relative sliding movement thereto in the direction of its length, means for pivotally connecting the ends of the legs of the U-shaped link to the shoe on opposite sides thereof so that the link and block will be rotated by the shoe as it moves outwardly due to expansion of the drum or lining wear thereby causing relative sliding movement between the abutment surfaces, said curved surfaces having the same radius of curvature with a common axis coinciding with the axis of the pivotal connection between the link and the shoe, and a spring interposed between the base of the U-shaped link and the block for holding the curved surfaces in pressure engagement.

STEVE SCHNELL.